Patented June 10, 1941

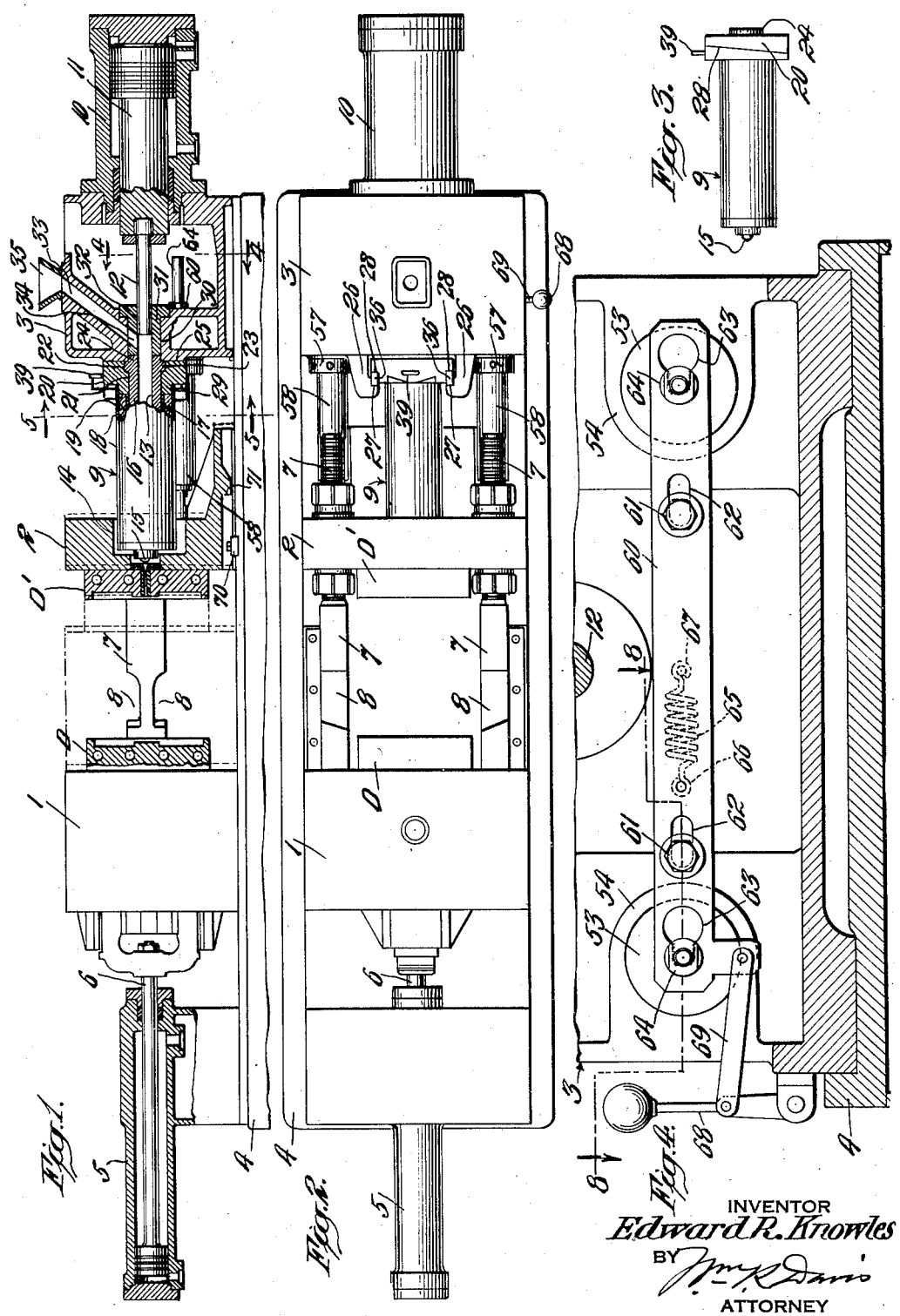

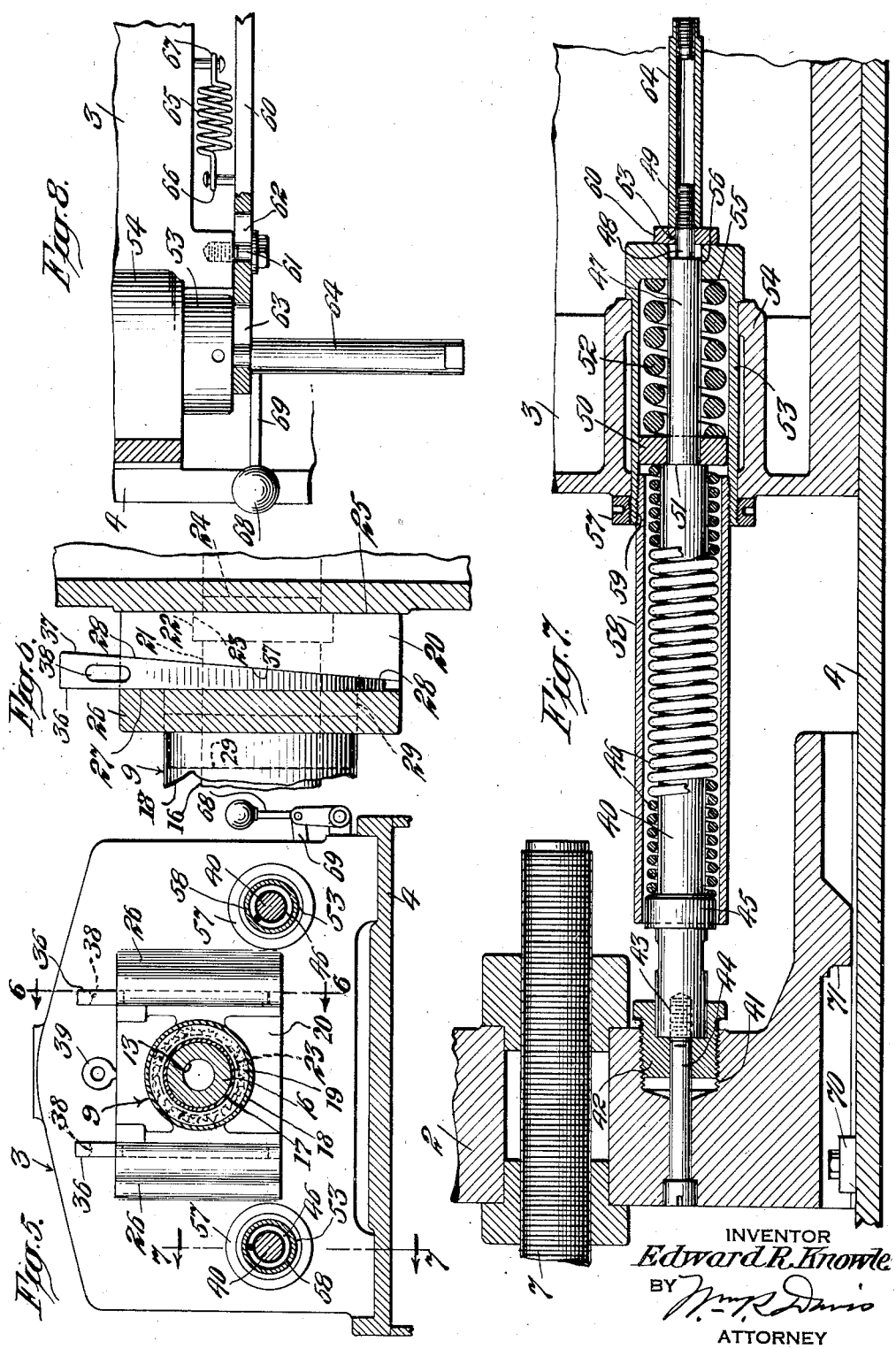

2,244,842

UNITED STATES PATENT OFFICE 2,244,842

INJECTION MOLDING MACHINE

Edward R. Knowles, Bridgeport, Conn., assignor to The Watson-Stillman Co., Roselle, N. J., a corporation of New Jersey Application January 28, 1939, Serial No. 253,297

6 Claims. (Cl. 18—30)

This invention relates to improvements in machines for injection molding of thermoplastic materials. Such machines have an injection cylinder in which a charge of the molding material is heated and plasticized in preparation for injection from the cylinder and into a mold. There is quite a variety of such materials, of different colors and other characteristics and, in order to obtain flawless molding, a change from one material to another requires a change of injection cylinders in the machine. Heretofore the cylinder has been mounted in a manner to render it difficult to remove from the machine. Usually it is secured in place by bolts or screws and as these are subjected to heat from the injection cylinder they are difficult to remove. Consequently much time and labor is wasted in changing cylinders.

An important object of the invention is to provide, in an injection molding machine, an improved mounting for the injection, or heating, cylinder designed to facilitate installation and removal of the cylinder.

Other objects of the invention will appear hereinafter.

In the drawings,

Fig. 1 is a sectional side view of an injection molding machine embodying the invention, the base frame of the machine being broken away;

Fig. 2 is a top plan view of said machine;

Fig. 3 is a side elevation of the heating cylinder unit removed from the machine;

Fig. 4 is an enlarged vertical section on the line 4—4 of Fig. 1;

Fig. 5 is an enlarged vertical section on the line 5—5 of Fig. 1;

Fig. 6 is an enlarged vertical section on the line 6—6 of Fig. 5; and

Fig. 7 is an enlarged vertical section on the line 7—7 of Fig. 5.

The machine embodying the invention includes a pair of opposed die-holding heads 1 and 2 and an injector supporting head 3, in horizontal tandem arrangement upon a base frame 4, only the upper portion of which is shown. The heads 1 and 2 are mounted for fore-and-aft sliding movement upon the base frame, and the head 3 is mounted in a fixed position upon the frame. A hydraulic cylinder 5 is rigidly mounted upon the base frame, forward of the head 1, and has a ram 6 in pull-and-thrust connection with said head for shifting the latter toward and from the heads 2 and 3. Head 2 bears a pair of laterally spaced resistance rods 7 extending forward to the head 1, and said pull-and-thrust connection includes a locking mechanism cooperable with keeper notches 8 in the resistance rods, to lock the heads 1 and 2 in a relation to hold a molding die D borne by the head 1 in mold-closing contact with a cooperating molding die D' borne by the head 2. The said die-locking mechanism is disclosed in my copending U. S. Patent application, Serial No. 204,122, filed April 20, 1938. Much of the mechanism is omitted here in order to simplify the illustration.

The head 3 bears the injection apparatus for charging a mold, formed by the dies D and D', with thermoplastic material. Said apparatus includes an injection, or heating cylinder 9, mounted upon the forward side of the head 3, and a hydraulic cylinder 10 mounted upon the rear side of the head. These cylinders are in horizontal axial alinement and the hydraulic cylinder contains a ram 11 to which is affixed an injection plunger 12 reciprocable in the bore 13 of the heating cylinder. The heating cylinder extends forward from the head 3 and its forward end portion protrudes into a cavity 14 in the head 2 and has a nozzle 15 for injection of a plastic charge through a mold gate in the die D', to charge the mold formed by the dies D and D'. The cylinder comprises a tubular body 16 surrounded by electrical heating means 17 enclosed by a casing 18, with interposed heat-insulating material 19.

There is provided for the heating cylinder unit 9 a mounting designed to facilitate its removal and replacement. The mounting includes a metal block or plate 20 having a central bore 21 and a counterbore 22 at the rear face of the block. Said bore snugly receives a rear end portion of the cylinder body 16 and the counterbore snugly receives a peripheral enlargement or flange 23 integrally formed on the cylinder body. The latter is also formed with an annular centering projection 24 protruding rearwardly from flange 23. The forward wall of the head 3 is formed with a flat, relieved face surface 25 forming a seat for the rear face of the block 20. At opposite sides of said seat said front wall is formed with rigid, vertical ribs 26 undercut or hook-like in horizontal section to receive the block between them and provide rearwardly facing vertical abutment surfaces 27 in spaced opposition to opposite side margins 28 of the block. These margins slope downwardly and forwardly and are set back from an annular central area 29 at the front face of the block. The forward portion of the head 3 has a central bore 30 whose forward end snugly receives the centering projection 24.

A bushing 31 is fitted in the bore 30 and abuts the rear end of the projection 24. The bore 32 of said bushing is of the same diameter as the cylinder bore 13 and forms a continuation of the latter, to receive the injection plunger 12 and the charge of material to be injected. A charging passage 33, formed in head 3, leads downwardly and forwardly and opens into a charging port 34 in the bushing. At its upper end said passage has a flared mouth 35 to receive the material.

The injection cylinder unit is rigidly and releasably secured to the fixed head 3 by means of a pair of wedges 36 driven downwardly between the rib surfaces 27 and the opposed side margins 28 of the block 20. The rear edges 37 of the wedges slope correspondingly to the slope of the margins 28. The wedges lock the block firmly aginst the seat 25 and the block supports the cylinder firmly in horizontal position, with the centering projection of the cylinder fitted in the bore 30, and the cylinder flange 23 also bearing against said seat around the bore 30. For removal of the wedges each is provided, near its upper end, with a slot 38 to receive a wedge-like drift tool, not shown. By driving such a tool between the upper end of one of the ribs 26 and the upper end of the said wedge slot the wedge may be quickly forced upwardly for removal. At its upper side the block 20 bears an eye or loop 39 to which a hoisting means, not shown, may be coupled to lift the heating cylinder unit from the machine after withdrawal of the wedges.

Before the cylinder unit can be lifted from the machine the forward end of the cylinder must be freed from the head 2 into which it projects to reach the mold gate. Means are provided for quickly and easily doing this by shifting the head 2 forwardly toward the head 1. A pair of horizontal rods 40 are connected to the head 2, at points directly beneath the connections of the resistance rods 7 with said head, and extend rearwardly through the front portion of the fixed head 3. For the connection of each rod to the head 2 the latter has, at its rear face, a threaded hole 41 into which a threaded rod-adjusting thimble 42 is screwed. The forward end of the rod is fitted into the thimble and has a threaded bore 43. A screw 44 is passed rearward through registering bores in the head 2 and the thimble and screwed into the rod bore 43. Each rod has an enlargement 45 forming a forward abutment for a compression spring 46 surrounding the rod. At the head 3 each rod has a reduced portion 47 and a further reduced rear end portion 48 screw threaded, as at 49. A collar 50 fitted over the reduced portion 47 and abutting the adjacent shoulder 51 afforded by the unreduced portion of the rod forms a rear abutment for the spring 46. Said collar also forms a forward abutment for a compression spring 52 encircling the portion 47 of the rod and much stronger than the spring 46. Spring 50 is housed in a thimble-like bushing 53 fitted within a tubular boss 54 formed on the inner side of the front wall of the head 3. At its rear end the bushing 53 forms a rear abutment 55 for the spring 52 and has a bore 56 into which the rear end of rod portion 47 slidably fits and from which the rod portion 48 projects. At its forward end the bushing is externally threaded and has a nut 57 screwed thereon to abut the forward face of the head 3. The forward end of the bushing is also internally threaded and a tubular housing 58 for the spring 46 is externally threaded and screwed into the bushing, as at 59. The forward end of said tubular housing fits over the enlargement 45 of the rod.

The lighter springs 46 are for the purpose of forcing the head 2 forward, away from head 3, to free the forward end of the heating cylinder. The purpose of the heavier spring is to provide a yieldable resistance to movement of the head 2 toward the head 3, after the mold has been closed by the ram 6, and cushion the contact between the die D' and the injector nozzle 15. Normally the head 2 is held in the position shown in Figs. 1, 2 and 7, with the springs 46 compressed and urging the head 2 away from the head 3 but with the strong springs 52 uncompressed. Head 2 is retained in that position by a latch bar 60 extending crosswise within the hollow head 3 and bearing against the rear ends of the bushings 53. Said bar is supported for limited longitudinal sliding by headed screws 61 secured to the interior of the head 3 and extending through slots 62 in the bar. Outwardly of the slots 62 the latch bar has slots 63 enlarged at one end. The reduced ends 49 of rods 40 extend through the slots 63 and have tubular, handle-like stop members 64 screwed thereon. These members are too large to pass through the narrow portion of the slots 63 but can pass through the enlarged portion of the slots, when in register therewith, and can also pass into the end bores 56 in the bushings 53. A tension spring 65 has one of its ends anchored, as at 66, to the latch bar and its opposite end anchored, as at 67, at a fixed point within the head 3. This spring normally holds the bar in such position that the small portion of the slots 63 are in front of the stop members 64 so that the latter abut the margins of the slots and, through the rods 40, hold the head 2 back over the forward end of the injection cylinder against the forward urge of the springs 46. For shifting the latch bar to release position, with the enlarged portion of the slots 63 in front of the stop members 64, there is a hand lever 68. The latter is pivotally mounted at one end upon one side of the head 3. A link 69 operatively connects the lever, at an intermediate point, with a depending lug on the latch bar.

Assuming that the head 2 is latched back, as shown in Figs. 1, 7 and 8, shift of the mold closing and opening ram 6 to the right moves the head 1 toward the head 2 to bring the die D into mold-closing contact with the die D' and lock the head 1 to the resistance rods 6 anchored to the head 2, thereby locking the mold closed. Rods 40 are so adjusted lengthwise, by means of the screw-threaded thimbles 42, as to position the head for mold closing and locking without rearward shift of said rods and compression of the strong springs 52. After the mold is closed and locked however, further shift of the ram 6 moves back the heads 1 and 2 and the interposed mold as a unit, as indicated by dotted lines in Fig. 1, to bring the entrance of the mold gate into sealing contact with the injection nozzle 15. This final movement is resisted by shift of the rods 40 against the resistance of the strong springs 52 which are compressed slightly and cushion said sealing contact. After injection of the charge into the mold, reverse shift of the ram 6 permits the springs 52 to force the head 2 forwardly to break contact of the mold gate with the injection nozzle. The extent of said break is gauged by adjustment of the screw-threaded stops 64 which limit said forward movement of the head 2 by the springs 52. As the movement of said ram continues, the head 1 is unlocked from the resistance rods and then said head is drawn forwardly, away from the head 2, to open the mold.

When the injection cylinder requires servicing, or change of the molding material calls for substitution of another cylinder, the cylinder unit is dismounted as follows: With the head 1 fully withdrawn from the head 2, the latch operating lever 68 is swung outward to shift the latch bar 60, against the resistance of spring 65, to release position, with the enlarged portion of the slots 63 in register with the stop members 64. The compressed springs 46 can then expand and advance the head 2 to a position free from the forward end of the injection cylinder. A stop 70 on the base frame 4 is engaged by an abutment 71 on the head 2 to limit said movement of the latter. After thus freeing the head 2 from the forward end of the injection cylinder, a hoisting means is connected to the eye 39 of the block 20, then the wedges 36 locking the rear end of the cylinder to the head 2 are upwardly withdrawn and the cylinder unit is lifted bodily from the machine.

After replacement of the injection cylinder the head 2 is restored to normal position and latched there by operation of the ram 6 for another mold-closure. By transmission of thrust from the ram through the head 1 and the dies to the head 2 the latter is shoved back to compress the springs 46 and force the stops 64 rearward out of the enlarged portion of the slots 63. As soon as that happens the latch spring 65 acts to shift the latch to locking position, with the narrow portion of the slots in front of the stop members 64, to lock the head 2 against forward movement by the spring 46 when the mold is subsequently opened.

What I claim is:

1. In a molding machine including a horizontal cylinder to receive a charge of material for injection into a mold, a mounting for said cylinder comprising a cylinder-supporting head, a supporting block borne by and transversely surrounding the cylinder to seat against the forward face of said head, rigid, parallel, vertical guide ribs borne by said head and undercut to receive said block therebetween and provide the ribs with rearwardly facing abutments in opposed spaced relation to opposite side margins of said block, and wedges driven downwardly between said rib abutments and block margins to lock the cylinder in operative position upon the supporting head, the supporting block being withdrawable upwardly from between said ribs after retraction of said wedges, for dismounting of the cylinder from said head.

2. In a molding machine, a horizontal cylinder to receive a charge of material for injection into a mold, a mounting for said cylinder comprising a cylinder-supporting head having a bore, a rear end portion of the cylinder being fitted in said bore to center the cylinder and the cylinder having an enlarged portion to seat against the head around said bore, an abutment block borne by the cylinder and bearing against said head and having a central bore receiving the cylinder and counterbored at its rear end to receive said cylinder enlargement and provide an abutment for the forward face of said enlargement, and anchoring means at opposite side margins of said block to lock the block rigidly to said head and including wedges inserted transversely of the length of the cylinder and retractible for release of the block and cylinder from the head.

3. In an injection molding machine, an injection cylinder provided at its forward end with a mold-charging nozzle, means at the rear end to releasably mount said cylinder in a fixed position to receive a charge of material for injection into a mold, a molding die supporting member formed with an opening to receive the discharge nozzle and the forward end of the cylinder and mounted for shifting axially of said cylinder toward and from the cylinder nozzle and having a normal position in which position the discharge nozzle and the forward end of the cylinder project into the said member, a rod anchored to said die-supporting member and extending rearwardly along the line of shift thereof toward the cylinder mounting, a coiled compression spring encircling said rod and adapted when released to cause movement of said die-supporting member from said normal position to a position away from the forward end of the injection cylinder, another stronger compression spring encircling said rod in the rear of and in tandem relation to said first spring, a floating abutment for said springs between the opposed ends thereof, an abutment on said rod engageable with said floating abutment to compress said stronger spring by rearward movement of the said die-supporting member from said normal position toward the cylinder mounting to bring a mold gate into connection with said nozzle, latch means to lock said rod against forward movement and thereby hold said die-supporting member against forward shift away from said cylinder by the urge of said first spring, and means whereby the rod may move rearwardly through the latch means against the resistance of said stronger spring when the die-supporting member is moved to cause the nozzle to engage the mold gate.

4. In an injection molding machine, an injection cylinder provided with a mold-charging nozzle, means to releasably mount said cylinder in a fixed position, a molding die supporting member formed with an opening to receive at its forward end the mold gate of a die carried by said die-supporting member, and to receive at its rear end the discharge nozzle and the forward end of the cylinder and mounted for shifting axially of said cylinder toward and from the cylinder nozzle and having a normal position in which position the discharge nozzle and the forward end of the cylinder project into the said member with the nozzle out of contact with the mold gate of the die carried by said die-supporting member, a pair of rods anchored to said die-supporting member one rod at each side of said cylinder and extending rearwardly, a coiled compression spring encircling each of said rods and adapted when released to cause forward movement of said die-supporting member from said normal position to a position away from the injection cylinder, another stronger compression spring encircling each of said rods and in tandem relation to said first spring, a floating abutment on each rod for said springs between the opposed ends thereof, an abutment on each of said rods engageable with said floating abutments to compress said stronger springs by rearward movement of the said die-supporting member from said normal position toward the cylinder mounting to bring a mold gate into connection with said nozzle, and latch means to simultaneously lock said rods against forward movement and thereby hold said die-supporting member against forward shift away from said cylinder by the urge of said weaker springs, said latch permitting the rods to move rearwardly against the resistance of said stronger springs when the die-supporting member is moved to cause the nozzle to engage the mold gate, and means to move said latch means to simultaneously release both of said rods for movement by said weaker springs.

5. In an injection molding machine, an injection cylinder provided at its forward end with a mold-charging nozzle, means for releasably mounting said cylinder at its rear end in a fixed position, a molding die supporting member recessed to receive the charging nozzle and the forward end of the cylinder and mounted for shifting axially of said cylinder toward and from the cylinder nozzle and having a normal position at the forward end of the cylinder, a rod anchored to said die-supporting member and extending along the line of shift thereof and toward the cylinder mounting, a coiled compression spring encircling said rod and adapted when released to cause movement of said die-supporting member forward away from the injection cylinder, another stronger compression spring encircling said rod and in tandem relation to said first spring and at the rear end thereof, a floating abutment for said springs between the opposed ends thereof, an abutment on said rod engageable with said floating abutment to compress said stronger spring by rearward movement of the said die-supporting member from said normal position to bring a mold gate into connection with said nozzle, latch means automatically operating to lock said rod against forward movement after the die-supporting member has been moved to said normal position and the weaker spring has been compressed a predetermined extent and thereby hold said die-supporting member against forward shift away from said cylinder by the urge of said first spring, and means whereby the said rod may move rearwardly through the latch means when the die-supporting member is shifted rearwardly from the normal position for said mold gate and nozzle connection without release of the latch means.

6. In an injection molding machine, an injection cylinder provided at its forward end with a mold-charging nozzle, a rigid cylinder-supporting head, means for releasably mounting said cylinder at its rear end in a fixed position to said cylinder-supporting head, a molding die supporting member recessed to receive the charging nozzle and the forward end of the cylinder and mounted for shifting axially of said cylinder toward and from the cylinder nozzle and having a normal position at the forward end of the cylinder, a rod anchored to said die-supporting member and extending along the line of shift thereof and through the cylinder-supporting head, a coiled compression spring encircling said rod and adapted when released to cause movement of said die-supporting member forward away from the injection cylinder, another stronger compression spring encircling said rod and in tandem relation to said first spring and at the rear end thereof, a floating abutment for said springs between the opposed ends thereof, an abutment on said rod engageable with said floating abutment to compress said stronger spring by rearward movement of the said die-supporting member from said normal position to bring a mold gate into connection with said nozzle, latch means carried by the cylinder-supporting head and automatically operating to lock said rod against forward movement after the die-supporting member has been moved to said normal position and the weaker spring has been compressed a predetermined extent and thereby hold said die-supporting member against forward shift away from said cylinder by the urge of said first spring, a rigid abutment carried by the cylinder-supporting head for the rear end of said stronger spring, said abutment being apertured for the passage of said rod, and means whereby the said rod may move rearwardly through the latch means when the die-supporting member is shifted rearwardly from the normal position for said mold gate and nozzle connection without release of the latch means.

EDWARD R. KNOWLES.